1

3,370,922
PURIFICATION OF CYANAMIDE
Gerald Myer Jaffe, Verona, and William Richard Rehl, Upper Montclair, N.J., assignors to Hoffmann-La Roche Inc., Nutley, N.J., a corporation of New Jersey
No Drawing. Filed Mar. 23, 1965, Ser. No. 442,162
5 Claims (Cl. 23—190)

ABSTRACT OF THE DISCLOSURE

A purification process whereby technical grade cyanamide solution containing sulfur contaminants is upgraded by treatment with halogen or an organic positive halogen compound to render the cyanamide suitable for catalytic hydrogenation in the conversion to formamidine.

---

This invention relates to the purification of cyanamide. More specifically, it relates to a process of treating cyanamide to render it suitable for catalytic hydrogenation to formamidine. Thus, in one particular aspect the invention relates to a process for preparing cyanamide freed of sulfur impurities, such as thiourea, thiocyanate, etc., starting from impure cyanamide containing said sulfur impurities. Cyanamide is a commercially available chemical which has a variety of uses among which is its utilization as a starting material in the synthesis of aminomethylenemalononitrile, an important intermediate in the synthesis of vitamin $B_1$. Aminomethylenemalononitrile can be prepared by the catalytic hydrogenation of cyanamide to give formamidine which is then condensed with malononitrile to form aminomethylenemalononitrile.

One convenient process for the hydrogenation of cyanamide and subsequent condensation with malononitrile comprises preparing formamidine hydrochloride by treating a mixture of cyanamide, ammonium chloride and a solvent with hydrogen in the presence of a Pd-charcoal catalyst and thereafter condensing with malononitrile in the presence of ammonia. The hydrogenation and condensation steps are not a part of this invention but are disclosed here for the sake of completeness. The success of the hydrogenation step in the process of preparing formamidine from cyanamide depends upon the purity of the cyanamide starting material. The hydrogenation of technical grade cyanamide cannot be achieved owing to the presence of sulfur compounds which poison the hydrogenation catalyst. It has now been found that these impurities can be readily removed by pretreating the cyanamide with halogen or certain halogen-containing compounds. This process utilizes the specific oxidizing action of halogens employed either in their elemental form or in the form of organic positive halogen compounds.

The term "halogen" encompasses chlorine, bromine and iodine. By the term "organic positive halogen compounds" is meant an organic compound which will release halogen atoms of positive polarity. The halogens can be employed in elemental form, e.g., liquid bromine, gaseous chlorine, etc., or dissolved in a suitable solvent such as, for example, bromine water, chlorine water and the like. Exemplary organic positive halogen compounds are compounds such as N-bromosuccinimide, N - chlorosuccinimide, 1,3-dibromo-5,5-dimethylhydantoin, N-iodosuccinimide, etc. Bromine and bromine compounds are especially preferred for the purification treatment of this invention.

Commercial technical grade cyanamide, i.e., technical grade cyanamide in 50 percent aqueous solution, contains thiourea as a contaminant in amounts from about 0.05 percent to about 0.2 percent by weight. This and other sulfur contaminants account for about 0.05 to about 0.3 percent by weight of technical grade cyanamide solution. Additionally, there are present in technical grade cyanamide a number of other impurities and additives including trace metals and stabilizing buffers. A typical commercially available technical grade cyanamide is a product prepared by the American Cyanamid Company, New York, N.Y., known as Aero Cyanamide–50 which has the following composition:

| | | |
|---|---|---|
| Cyanamide | percent | 50 |
| Monosodium phosphate (stabilizing buffer): | | |
| On solution | do | 2 |
| On $H_2NCN$ | do | 4 |
| Dicyandiamide | do | 3–4 |
| Urea | do | 0.1–0.3 |
| Thiourea | do | 0.05–0.1 |
| Thiocyanate | do | 0.05 |
| Iron, ca. | p.p.m. | 15 |
| Calcium, ca. | p.p.m. | 15 |

Aero Cyanamide–50 and commercially available cyanamides of about the same purity are referred to throughout this specification as technical grade cyanamide. In contrast thereto, cyanamide products referred to herein as pure cyanamide contain negligible impurities other than the added stabilizing agent and less than about one tenth of one percent of polymerization products. Aero Cyanamide–100, a pure cyanamide product, prepared by the American Cyanamid Company, has the following composition:

| | Percent |
|---|---|
| Cyanamide, ca. | 98 |
| Monosodium phosphate (stabilizing buffer) | 2 |
| Dicyandiamide, ca. | 0.1 |

Attempts to hydrogenate technical grade cyanamide of the above composition have been unsuccessful. The failure of the hydrogenation reaction to take place has been traced to the presence of certain impurities which act as catalyst poisons (sulfur compounds and trace metals). The water and stabilizing buffers present have no influence. The effect of these substances can be seen from the following table which illustrates the results of hydrogenating pure cyanamide and cyanamide to which there has been added water and thiourea, respectively.

TABLE I

| Additive: | Hydrogen uptake (percent) |
|---|---|
| None | 98 |
| Water (equal wt.) | 100 |
| Water plus thiourea (0.05 percent) | 37.5 |

Consequently, it is essential that measures must be taken to remove and/or detoxify the catalyst poisons, i.e., the sulfur contaminants and preferably also the trace metal contaminants, in technical grade cyanamide in order to obtain a satisfactory material for hydrogenation, i.e., cyanamide free of catalyst poisons. The trace metal impurities can be readily removed by the use of chelating agents such as ethylenediaminetetraacetic acid. Detoxification of the sulfur contaminants is accomplished by treating with halogen or a positive halogen compound according to the process of this invention.

The detoxification is suitable effected by simply adding halogen or a positive halogen compound to technical grade cyanamide and stirring the mixture at room temperature. The pH of the solution is preferably maintained between about pH 2.5 and about pH 7 in order to avoid decomposition of the cyanamide which occurs at low pH or polymerization which occurs at high pH. The halogen or halogen compound is preferably utilized in excess of the amount of halogen that is theoretically required to oxidize the sulfur contaminants present in technical grade cyanamide. Preferably there is employed a two- to four-fold molar excess based upon the amount of thiourea present in the impure cyanamide. Optionally, the cyanamide solution which has been purified by the above-described halogen treatment can be further purified by mixing with the hydrogenation catalyst and filtering.

In one particular embodiment the process of this invention comprises treating a commercial solution of cyanamide with small amounts of bromine and stirring the mixture for about ½ hour in order to permit the bromine to react with the sulfur impurities such as thiourea and thiocyanate. The bromine can be conveniently added either as liquid bromine or in solution such as bromine water. The amount of bromine used is not critical; however, it should be used in amounts sufficient to oxidize all of the sulfur impurities and any excess bromine remaining in the reaction mixture is preferably removed prior to hydrogenation. It is preferred to use the bromine in slight excess of the stoichiometrically required quantity and suitably the purification treatment is conducted with about two to three times the theoretical amount of bromine required to oxidize the thiourea contaminant. Removal of excess bromine is readily accomplished by drawing off the bromine vapors or by reducing the excess bromine, for example, with hydrazine hydrate, etc. Following the bromine treatment, it is desirable, though not essential, that the cyanamide solution be treated with a small amount of Pd-charcoal hydrogenation catalyst in order to remove residual impurities. Such catalytic pretreatment is suitably accomplished by mixing a small amount of hydrogenation catalyst, preferably less than about 10 percent by weight of the cyanamide, stirring for a few minutes and filtering off the catalyst.

The purification process of this invention will be more fully appreciated from the following table and specific examples which are illustrative of the invention and are not to be construed as limitative thereof.

chloride and 3.5 g. 10 percent Pd-on-carbon catalyst. The mixture was hydrogenated at 50 lbs. hydrogen pressure and 27° C. for about 45 min. The hydrogen uptake was 100 percent of theory, i.e., 1.25 moles hydrogen. The temperature rose to 37° C. during the hydrogenation. After completion of the hydrogenation, the catalyst was filtered off and washed with several portions of ethanol and recycled into the mixed batch. The filtrate was transferred to a 2-liter, 3-neck flask and cooled to 15° C. 66 g. (1.0 mole) malononitrile were added in one portion and the mixture was stirred for two hours. During this period the malononitrile dissolved and ammonium chloride precipitated. The temperature was allowed to rise to room temperature (i.e., above 20° C.). 87 ml. of hydrochloric acid were then added to the reaction mixture to lower the pH from about 9.6 to between about 3.0 and 5.0. The temperature rose slightly to 23° C. The ammonium chloride solids were filtered and washed with about 100 ml. of ethanol. The filtrate was purified in an ion exchange column containing Amberlyst-15 on the hydrogen ion cycle to give substantially pure aminomethylenemalononitrile.

*Example 2*

To 12.6 g. of cyanamide solution (50 percent aqueous) there was added 0.025 g. of ethylenediaminetetraacetic acid and 0.50 g. of bromine. The mixture was stirred at room temperature for about 45 min. and then there was added 0.5 g. of 10 percent Pd-on-carbon catalyst and 25 ml. of ethanol. After stirring for 30 min., the mixture was filtered and the filtrate was hydrogenated in the usual manner.

*Example 3*

To 12.6 g. of cyanamide solution (50 percent aqueous) there was added 0.25 g. of N-bromosuccinimide and the mixture was stirred at room temperature for about 45 min. There were then added 0.025 g. of ethylenediamintetraacetic acid, 25 ml. of ethanol and 0.5 g. of 10 percent Pd-on-carbon catalyst and the mixture was again

TABLE II.—PRETREATMENT WITH POSITIVE HALOGEN

Starting materials:
1. Pure Cyanamide.
2. Technical Grade Cyanamide
3. N-bromo-succinimide (NBS)
4. Bromine Procedure: Pretreatment as described plus hydrogenation with specified catalyst quantities. (Pd-charcoal catalyst)

| Cyanamide | Reactions Conditions | Thiourea (grams) | Catalyst (grams) | Hydrogen Uptake | | |
|---|---|---|---|---|---|---|
| | | | | Percent/ 2 min. | Percent/ 4 min. | Total Percent |
| Pure, 6.3 g. (No thiourea) | No pretreatment | 0.0 | 2.0 | 55.0 | 98.1 | 101/6 min. |
| Pure, 6.3 g. (Plus thiourea) | do | 0.006 | 2.0 | 0.9 | 1.8 | 37.5/6 hrs. |
| Tech. Grade (12.6 g. of 50% aqueous solution). | do | 0.10%/S [1] | 0.5 | | | 1.7/1.5 hrs. |
| Do | Pretreatment with 0.5 gram of Pd-charcoal catalyst | 0.10%/S [1] | 0.5 | 5.2 | 7.7 | 60/5 hrs. |
| Do | Pretreatment with 0.05 g. NBS and 0.5 gram of Pd-charcoal catalyst. | 0.10%/S [1] | 0.5 | 12.7 | 17.8 | 86.0/4 hrs. |
| Do | Pretreatment with 0.10 g. NBS and 0.5 gram of Pd-charcoal catalyst. | 0.10%/S [1] | 0.5 | 11.9 | 20.3 | 93.0/1.75 hrs. |
| Do | Pretreatment with 0.25 g. NBS and 0.5 gram of Pd-charcoal catalyst. | 0.10%/S [1] | 0.5 | 29.5 | 59.5 | 100/25 min. |
| Do | Pretreatment with 0.50 g. NBS and 0.5 gram of Pd-charcoal catalyst. | 0.10%/S [1] | 0.5 | 23.7 | 46.6 | 100/30 min. |
| Do | Pretreatment with 0.50 g. NBS and 0.5 gram of Darco. | 0.10%/S [1] | 0.5 | 17.8 | 32.3 | 91.5/60 min. |
| Do | Pretreatment with 0.88 g. Br₂ and 0.5 gram of Pd-charcoal catalyst. | 0.10%/S [1] | 0.5 | 29.6 | 54.2 | 101/17 min. |
| Do | Pretreatment with 0.25 g. Br₂ and 0.5 gram of Pd-charcoal catalyst. | 0.10%/S [1] | 0.35 | 15.2 | 32.3 | 100/31 min. |
| Do | Pretreatment with 0.25 g. Br₂ and 0.35 gram of Pd-charcoal catalyst. | 0.10%/S [1] | 0.35 | 15.2 | 28.7 | 97.5/60 min. |
| Do | Pretreatment with 0.25 g. Br₂ | 0.10%/S [1] | 0.5 | 16.1 | 33.1 | 99/35 min. |

[1] S represents sulfur.

*Example 1*

105.0 g. (1.25 moles) technical grade cyanamide were stirred in a 1 liter beaker together with 0.6 g. ethylenediaminetetraacetic acid and 3.0 g. bromine for 45 min. at room temperature. 3.5 g. of 10 percent Pd-on-carton catalyst and 250 ml. ethanol were added to the solution and the stirring was continued for 30 min. The solids were removed by filtration and the filtrate was placed in a 1200 ml. glass liner (American Instrument Company Hydrogenation Autoclave) together with 82 g. of ammonium stirred for about 30 min., after which it was filtered and the filtrate hydrogenated in the usual manner.

*Example 4*

To 12.6 g. of 50 percent aqueous cyanamide solution there was added 0.1 g. ethylenediaminetetraacetic acid and 0.8 g. of 2.5 percent aqueous chlorine solution. The mixture was stirred for one hour at room temperature. Then there were added .5 g. of 10 percent Pd-on-carbon and 25 ml. ethanol. Stirring was continued for an additional ½ hour at room temperature after which the mixture was filtered. The filtrate was washed with small portions of ethanol. The cyanamide obtained in this way was mixed with 8.2 g. of ammonium chloride and .5 g. of 10 percent Pd-on-carbon and hydrogenated at 50 lbs. p.s.i. hydrogen pressure and at a temperature of about 25–26°. The hydrogen uptake was about 83 percent theoretical and was complete in about two hours and five minutes.

*Example 5*

In order to illustrate the suitability of the purification process for large scale treatment of cyanamide, 90.75 lbs. of a 50 percent aqueous soltuion of technical grade cyanamide were treated with 163 g. of ethylenediaminetetraacetic acid and 285 g. of bromine. The mixture was stirred at room temperature for about ½ hour. The pH was maintained at about 2.8 by the addition of 200 ml. of ammonia. There were then added 3,255 g. of Pd-charcoal catalyst which had been used as the hydrogenation catalyst for a previous batch. The catalyst was washed and recycled for the pretreatment. After stirring for about 30 minutes in the presence of the catalyst, the mixture was filtered and the filtrate was hydrogenated in the usual manner.

We claim:
1. A process for rendering cyanamide containing sulfur impurities suitable for catalytic hydrogenation which comprises treating said cyanamide containing sulfur impurities with a member selected from the group consisting of halogens and organic positive halogen compounds in an amount greater than 1 mole per mole of sulfur impurities at a pH between about 2.5 and about 7.
2. The process of claim 1 wherein said cyanamide is treated with bromine.
3. The process of claim 1 wherein said cyanamide is treated with chlorine.
4. The process of claim 1 wherein said cyanamide is treated with an organic positive halogen compound.
5. The process of claim 4 wherein the organic positive halogen compound is a member selected from the group consisting of N-bromosuccinimide and 1,3-dibromo-5,5-dimethylhydantoin.

References Cited

FOREIGN PATENTS 150,105  11/1962  Russia.

OTHER REFERENCES

Williams: "Cyanogen Compounds," 2nd ed., 1948, Edward Arnold and Co., London, pp. 18–22.

Jacobson: "Encyclopedia of Chemical Reactions," vol. II, 1948, pp. 42–46.

OSCAR R. VERTIZ, *Primary Examiner.*

H. S. MILLER, *Assistant Examiner.*